United States Patent
Ahuja et al.

(10) Patent No.: US 7,930,540 B2
(45) Date of Patent: Apr. 19, 2011

(54) CRYPTOGRAPHIC POLICY ENFORCEMENT

(75) Inventors: Ratinder Paul Singh Ahuja, Saratoga, CA (US); Shaun Coleman, Saratoga, CA (US); Erik de la Iglesia, Mountain View, CA (US)

(73) Assignee: McAfee, Inc., Santa Clara, CA (US)

(*) Notice: Subject to any disclaimer, the term of this patent is extended or adjusted under 35 U.S.C. 154(b) by 1093 days.

(21) Appl. No.: 10/995,455

(22) Filed: Nov. 22, 2004

(65) Prior Publication Data

US 2005/0166066 A1    Jul. 28, 2005

Related U.S. Application Data (60) Provisional application No. 60/538,582, filed on Jan. 22, 2004.

(51) Int. Cl.
*H04L 9/32* (2006.01)
*H04L 29/06* (2006.01)

(52) U.S. Cl. .................................. 713/167; 713/189

(58) Field of Classification Search .................. 713/167, 713/189

See application file for complete search history.

(56) References Cited

U.S. PATENT DOCUMENTS

| | | | |
|---|---|---|---|
| 4,286,255 A | 8/1981 | Siy | |
| 4,710,957 A | 12/1987 | Bocci et al. | |
| 5,249,289 A | 9/1993 | Thamm et al. | |
| 5,465,299 A | 11/1995 | Matsumoto et al. | |
| 5,479,654 A | 12/1995 | Squibb | |
| 5,497,489 A | 3/1996 | Menne | |
| 5,557,747 A | 9/1996 | Rogers et al. | |
| 5,623,652 A | 4/1997 | Vora et al. | |
| 5,768,578 A | 6/1998 | Kirk | |
| 5,781,629 A | 7/1998 | Haber et al. | |
| 5,794,052 A | 8/1998 | Harding | |
| 5,813,009 A | 9/1998 | Johnson et al. | |
| 5,943,670 A | 8/1999 | Prager | |
| 5,995,111 A | 11/1999 | Morioka et al. | |
| 6,026,411 A | 2/2000 | Delp | |
| 6,078,953 A | 6/2000 | Vaid et al. | |
| 6,094,531 A | 7/2000 | Allison et al. | |
| 6,108,697 A | 8/2000 | Raymond et al. | |
| 6,161,102 A | 12/2000 | Yanagihara et al. | |
| 6,175,867 B1 | 1/2001 | Taghadoss | |
| 6,192,472 B1 | 2/2001 | Garay et al. | |
| 6,243,091 B1 | 6/2001 | Berstis | |
| 6,243,720 B1 | 6/2001 | Munter et al. | |
| 6,278,992 B1 | 8/2001 | Curtis et al. | |

(Continued)

OTHER PUBLICATIONS

Ethereal, "Computer program product for analyzing network traffic" Computer program product for analyzing network traffic, pp. 17-26 http://web.archive.org/web/20030315045117/www.ethereal.com/distribution/docs/user-guide.

(Continued)

*Primary Examiner* — Kambiz Zand
*Assistant Examiner* — Aubrey H Wyszynski
(74) *Attorney, Agent, or Firm* — Patent Capital Group (57) ABSTRACT

Objects can be extracted from data flows captured by a capture device. In one embodiment, the invention includes assigning to each captured object a cryptographic status based on whether the captured object is encrypted. In one embodiment, the invention further includes determining whether the object violated a cryptographic policy using the assigned cryptographic status of the object.

30 Claims, 6 Drawing Sheets

U.S. PATENT DOCUMENTS

| | | |
|---|---|---|
| 6,292,810 B1 | 9/2001 | Richards |
| 6,336,186 B1 | 1/2002 | Dyksterhouse et al. |
| 6,356,885 B2 | 3/2002 | Ross et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,457,017 B2 | 9/2002 | Watkins et al. |
| 6,493,761 B1 | 12/2002 | Baker et al. |
| 6,499,105 B1 | 12/2002 | Yoshiura et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,571,275 B1 | 5/2003 | Dong et al. |
| 6,598,033 B2 | 7/2003 | Ross et al. |
| 6,662,176 B2 | 12/2003 | Brunet et al. |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,293,067 B1 | 11/2007 | Maki et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 7,664,083 B1 | 2/2010 | Cermak et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1* | 10/2003 | Savarda et al. ............ 713/153 |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2004/0054779 A1 | 3/2004 | Takeshima et al. |
| 2004/0059736 A1 | 3/2004 | Willse et al. |
| 2004/0071164 A1 | 4/2004 | Baum |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0181513 A1 | 9/2004 | Henderson et al. |
| 2004/0181690 A1 | 9/2004 | Rothermel et al. |
| 2004/0194141 A1 | 9/2004 | Sanders |
| 2004/0196970 A1* | 10/2004 | Cole ............................ 380/1 |
| 2004/0230572 A1 | 11/2004 | Omoigui |
| 2004/0267753 A1 | 12/2004 | Hoche |
| 2005/0004911 A1 | 1/2005 | Goldberg et al. |
| 2005/0021715 A1* | 1/2005 | Dugatkin et al. ............ 709/223 |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0038809 A1 | 2/2005 | Abajian et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 | 6/2005 | Somasundaram |
| 2005/0149504 A1 | 7/2005 | Ratnaparkhi |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0083180 A1 | 4/2006 | Baba et al. |
| 2006/0150249 A1 | 7/2006 | Gassen |
| 2006/0167896 A1 | 7/2006 | Kapur et al. |
| 2006/0184532 A1 | 8/2006 | Hamada et al. |
| 2006/0242126 A1 | 10/2006 | Fitzhugh |

| | | |
|---|---|---|
| 2006/0242313 A1 | 10/2006 | Le et al. |
| 2006/0251109 A1 | 11/2006 | Muller et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0094394 A1 | 4/2007 | Singh et al. |
| 2007/0110089 A1 | 5/2007 | Essafi et al. |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |
| 2010/0121853 A1 | 5/2010 | de la Iglesia et al. |
| 2010/0185622 A1 | 7/2010 | Deninger et al. |

OTHER PUBLICATIONS

Preneel, Bart, "Cryptographic Hash Functions", Proceedings of the 3$^{rd}$ Symposium on State and Progress of Research in Cryptography, 1993, pp. 161-171.

Microsoft Outlook, Out look, copyright 1995-2000, 2 pages.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

U.S. Appl. No. 12/873,860, filed Sep. 1, 2010, entitled "A System and Method for Word Indexing in a Capture System and Querying Thereof," Inventor(s) William Deninger, et al.

U.S. Appl. No. 12/829,220, filed Jul. 1, 2010, entitled "Verifying Captured Objects Before Presentation," Inventor(s) Rick Lowe, et al.

U.S. Appl. No. 12/873,061, filed Aug. 31, 2010, entitled "Document Registration," Inventor(s) Ratinder Paul Singh Ahuja, et al.

U.S. Appl. No. 12/939,340, filed Nov. 3, 2010, entitled "System and Method for Protecting Specified Data Combinations," Inventor(s) Ratinder Paul Singh Ahuja, et al.

* cited by examiner

CRYPTOGRAPHIC POLICY ENFORCEMENT

PRIORITY AND RELATED APPLICATIONS

This patent application is related to, incorporates by reference, and claims the priority benefit of U.S. Provisional Application 60/538,582, entitled "ENCRYPTION DETECTION IN A DATA CAPTURE AND ANALYSIS SYSTEM", filed Jan. 22, 2004.

FIELD OF THE INVENTION

The present invention relates to computer networks, and in particular, to enforcing a cryptographic policy over a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprise's network.

SUMMARY OF THE INVENTION

Objects can be extracted from data flows captured by a capture device. In one embodiment, the invention includes assigning to each captured object a cryptographic status based on whether the captured object is encrypted. In one embodiment, the invention further includes determining whether the object violated a cryptographic policy using the assigned cryptographic status of the object.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
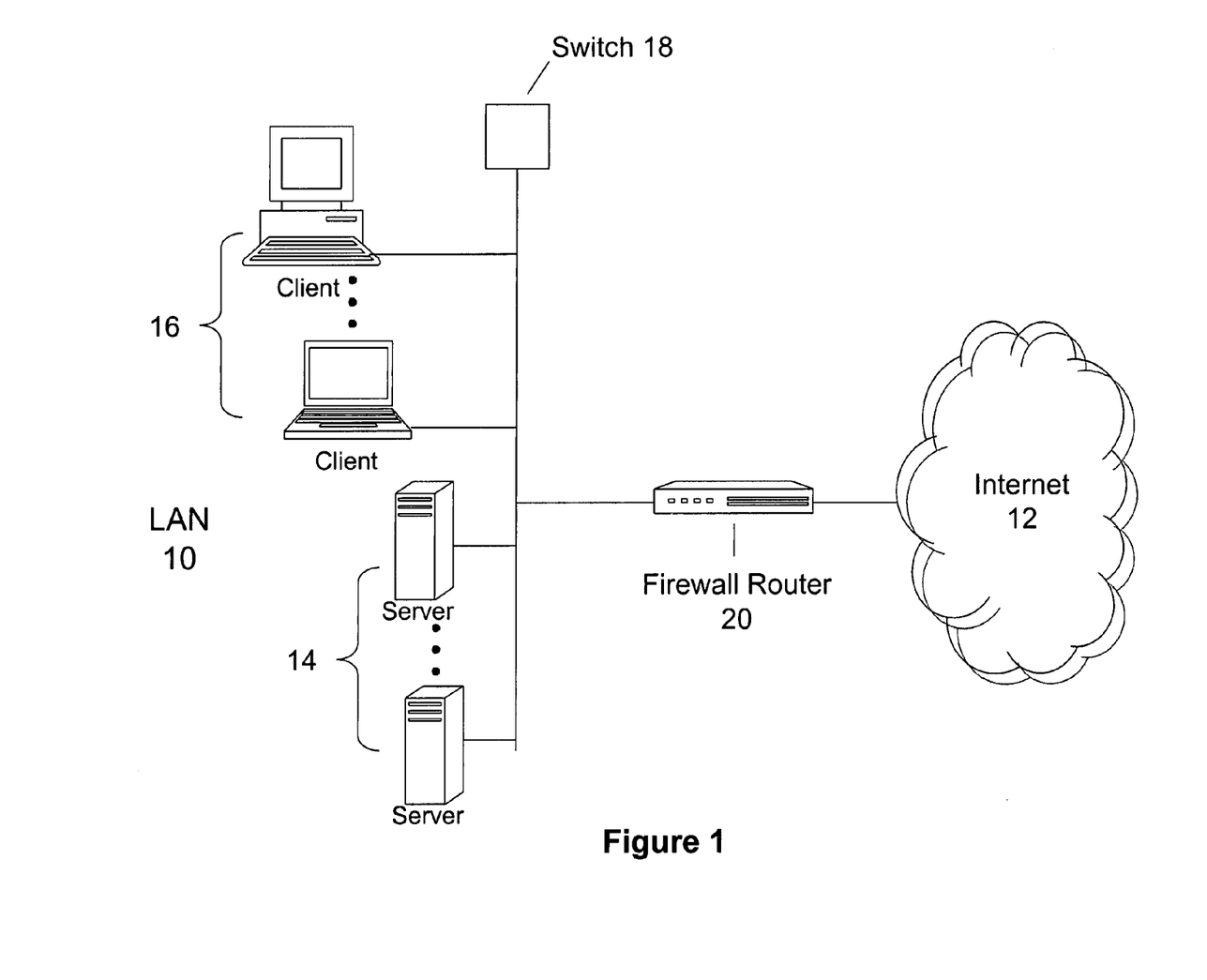
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyze, and searchably store the content contained in the forwarded packets.

Figure 2:
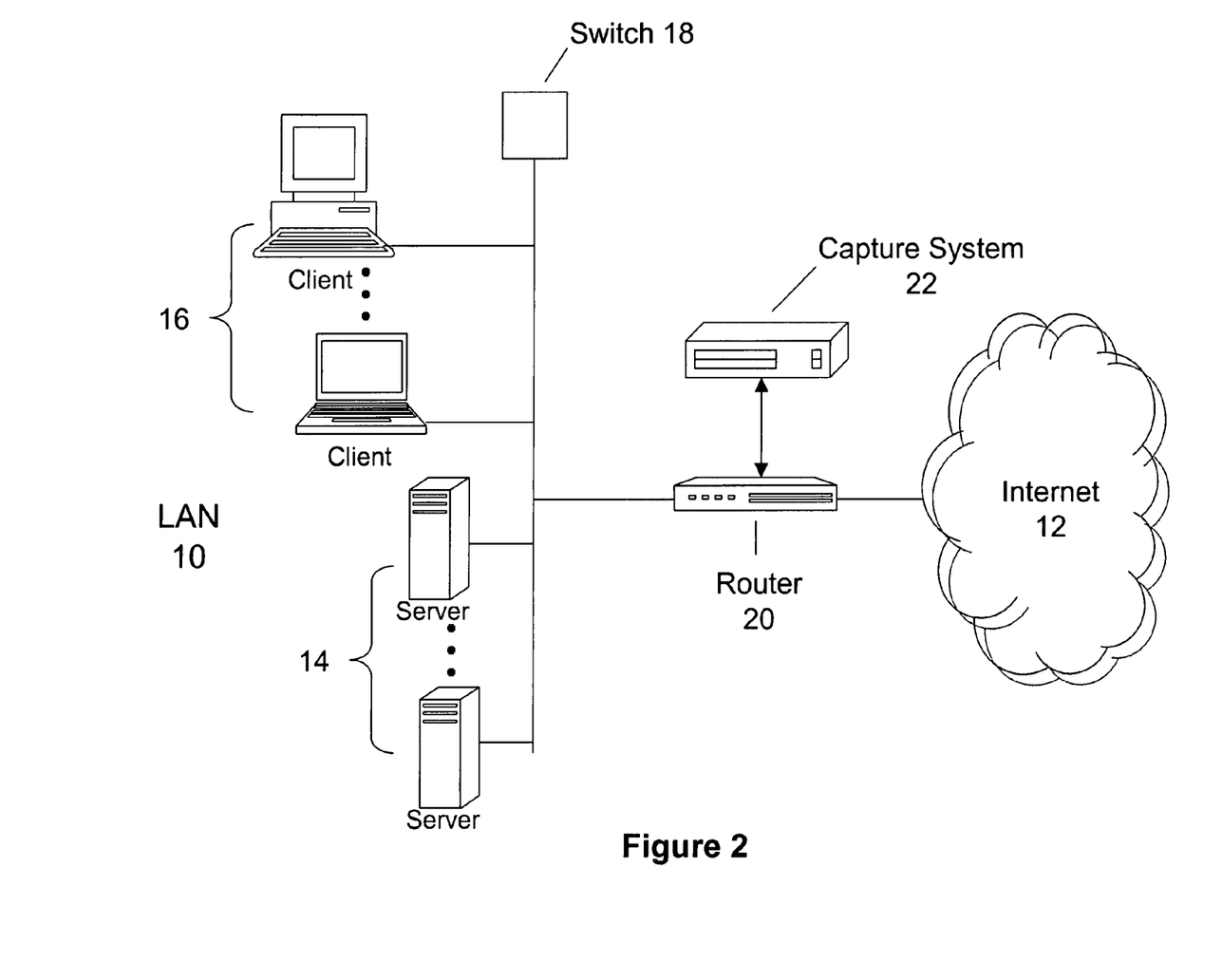
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
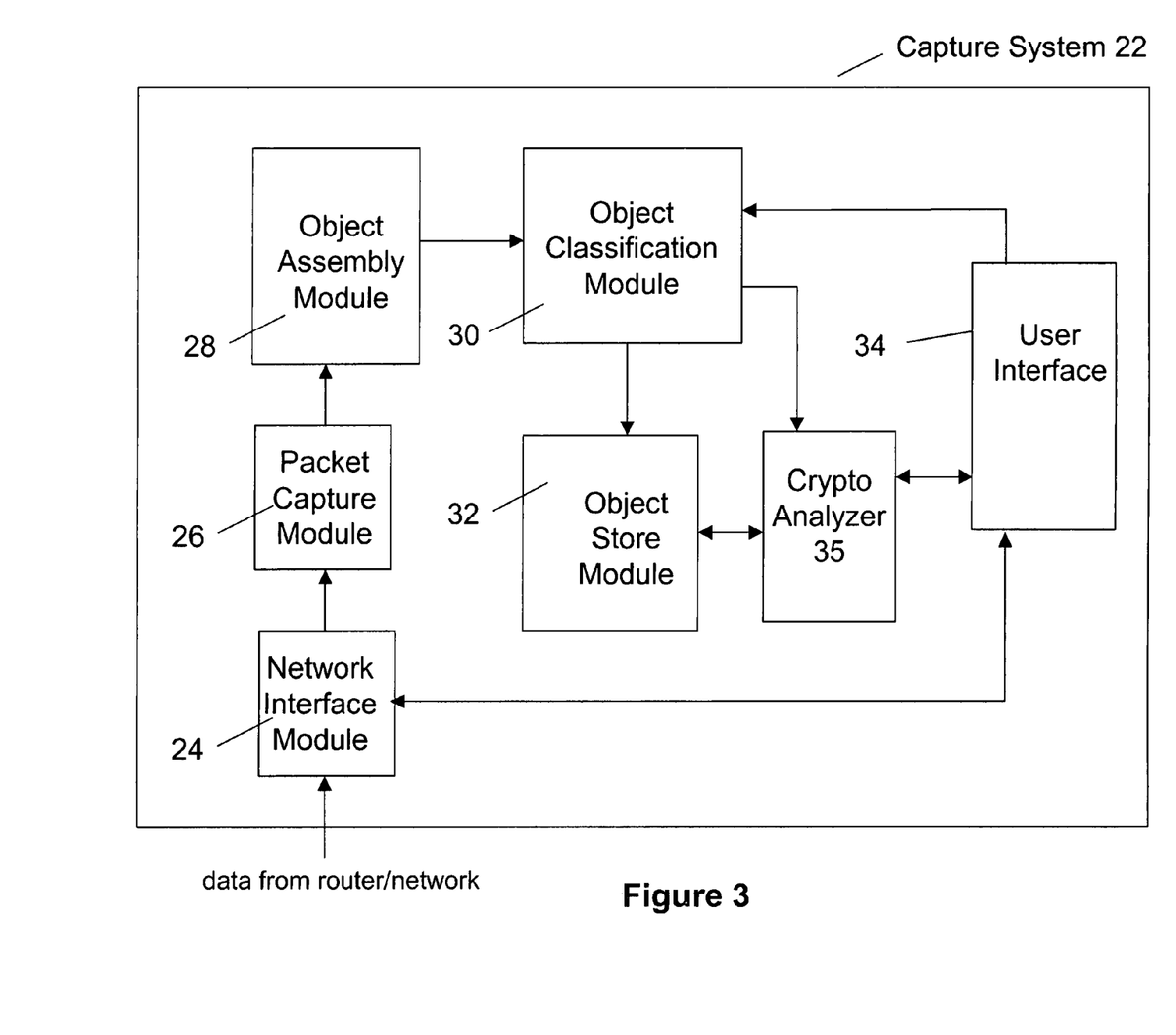
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
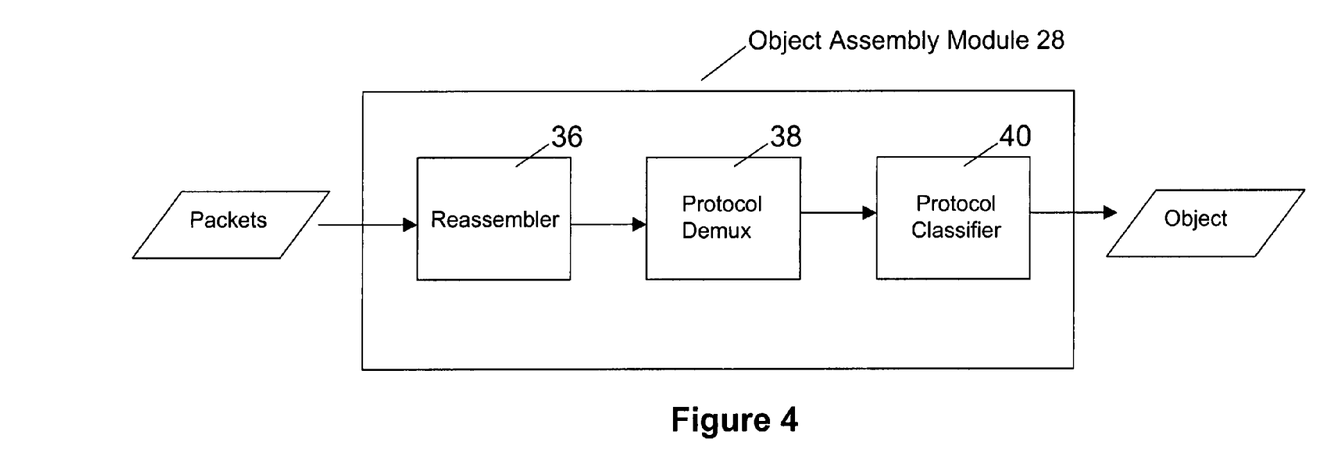
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassembler 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
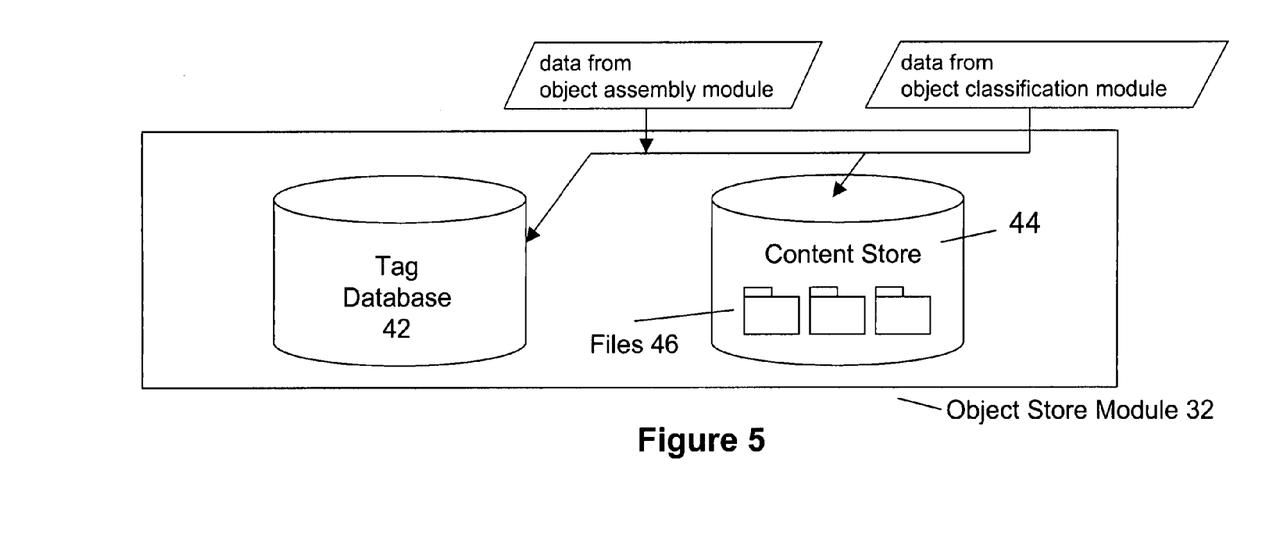
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |

TABLE 1-continued

| Field Name | Definition |
| --- | --- |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and field can be any digest or hash over the object, or some portion thereof, and the Tag Signature can similarly be any such digest or hash over the other tag fields or a portion thereof. In one embodiment, a well-known hash, such as MD5 or SHA1 can be used. In one embodiment, the Signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Encryption Detection and Cryptographic Policy Enforcement

In one embodiment, the capture system 22 described with reference to FIG. 3 also includes a cryptographic analyzer 35 (also referred to as the "crypto analyzer" for short). Referring again to FIG. 3, the crypto analyzer 35 is configured, in one embodiment, to scan the reassembled and captured objects to determine whether the objects are encrypted. In one embodiment, the crypto analyzer 35 does not determine whether the flows were sent using real-time encryption protocol (such as Secure Sockets Layer), but only determines whether the objects themselves were encrypted using some form of block cipher prior to transmission. In another embodiment, real-time protocol encryption is also detected by the crypto analyzer 35.

In one embodiment, the crypto analyzer 35 does not need to rely on any known content in the objects to detect whether they have been encrypted. There are various encryption detection methods that can be used to implement the crypto analyzer 35. For example, one method of detecting encrypted data to is to use the highly random nature of ciphertext to create a statistical method for distinguishing ciphertext from other binary data. For encrypted bytes, all the byte values from 0 to 255 will occur roughly the same number of times. For ASCII English documents the byte values above 128 rarely occur (only for formatting information), and most the byte values correspond to lower case letters. Binary formats such as compiled code for the CPU, or byte codes the Java, or database files for Oracle, also show a strongly non-uniform distribution of bytes.

In one embodiment, the crypto analyzer 35 uses a statistical measure based on a frequency count of the bytes that appear in a block of a particular size. For example, a block of 2048 bytes could be processed to produce a table that counted the number of times each byte value occurred (e.g., how many out of the 2048 bytes were zero, one, two, and so on, up to 255). A visual histogram of this table will show a fairly flat distribution if the data is encrypted, and a dramatically spiky distribution if the data is not encrypted.

For encrypted data, each byte value can be expected to appear 8 times on average (because 8 is 2048/256), with an expected statistical variance of about 3. This means that roughly 67% percent (the percentage of random values that fall within one standard deviation of the mean) of the counts will be between 5 and 11. For ASCII text, the values between 128 and 255 never appear, so some of the values between 0 and 127 is expected to occur well over 16 times.

In one embodiment, the crypto analyzer 35 uses a statistical measure known as the Index of Coincidence (IC) to detect encryption of objects. The IC is closely related to the statistical measure known as variance. The IC measures how much a distribution of numbers differs from being perfectly uniform (a flat histogram).

For example, define F[j] to be the frequency that the observed bytes were equal to j, that is, F[j] is a count of the number of times that the byte value, j, appeared in the block being tested. Define S to be the sum of the square of the F values: S=Sum (j=0 to 255, F[j]*F[j]). Define T to be S divided by the square of the block size: T=S/(N*N). For example N is 2048 if the block being tested contained 2048 bytes. Define C to be a cut off value (discussed below). We will declare that the data is Encrypted if T<C. Larger values of T indicate non-random data, which declare as Unencrypted. The cut off value C is defined relative to the expected value of T when the bytes are truly random. If all F[j] values are equal, then T=256 *((1/256)*(1/256))=1/256. The expected standard deviation for T (assuming random bytes) is also 1/256. To allow for the T statistical measure to accept random bytes that are three standard deviations away the expected value, the C should be 4/256 (mean plus three time standard deviations).

For many unencrypted binary data types, such as compressed files or sound files, a statistic encompassing the whole file would likely show all the possible byte values appearing roughly an equal number of times. However, with these types of binary files, there is a very strong correlation between near-by bytes. For example, a sound file in 8-bit WAV format exhibits a strong tendency for adjacent bytes to have numerical values that are close together because the amplitude of the sound wave being sampled varies slowly over the sampling time. This phenomenon also shows up in compressed files, executables, and byte code files.

In one embodiment, the crypto analyzer 35 improves the accuracy of the test by pre-processing the bytes before performing the appropriate statistical analysis. Rather than performing the test on the raw bytes, perform the test on the difference between adjacent bytes. For truly random bytes, this pre-processing will not make any difference (the difference (or sum) of two high entropy values is also a high entropy value). In one embodiment, such pre-processing will amplify the structured relationship between adjacent bytes for non-encrypted data.

For example, for the case of 16-bit sound files, the correlation between values shows up between every other byte. The test can examine both the difference between the even numbered bytes and the odd numbered bytes.

As a further example, some image files have 24-bit samples sizes (one byte each for Red, Yellow, and Green), and some data files have 32-bit sample sizes. In this case, a tool can examine differences between bytes that are one, two, three or four locations apart.

The S and T statistics discussed above generally work well for large sample sizes. However, if there were a small number of samples (the F[j] values were generally less than 5), the crypto analyzer 35 can switch to using an unbiased statistic, here referred to as S1 and T1. In one embodiment, S1 is defined as Sum (j=0 to 255, F[j]*(F[j]−1)), and T1 is defined as S1/(N*(N−1)). In one embodiment, the cut off value C is the same.

There are various other statistics and methods that can be used to determine whether a captured and reconstructed object is encrypted or not. In one embodiment, the crypto analyzer 35 also identifies the type of encryption used. In yet another embodiment, the crypto analyzer 35 also attempt to decrypt the object if possible.

In one embodiment, the capture system 22 uses the crypto analyzer 35 to implement a cryptographic policy over the network 10 monitored by the capture device. One embodiment of implementing such a policy is now described with reference to FIG. 7. In block 102, the packets traversing the network are captured and organized into flows as described above. In block 104, an object is assembled from the captured packets as described above.

Figure 7:
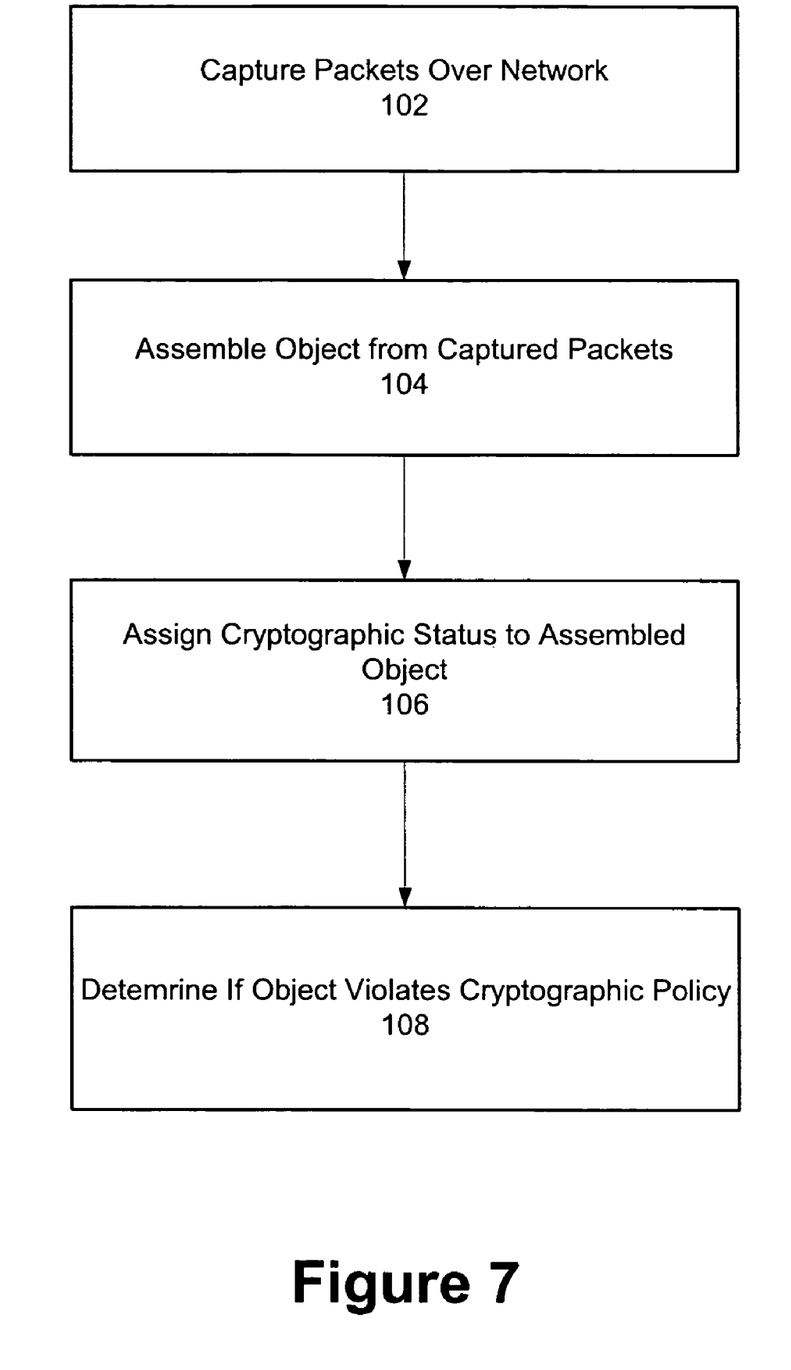
FIG. 7 is a flow diagram illustrating cryptographic policy enforcement according to one embodiment of the present invention.

In block 106, a cryptographic status is assigned to the object. In one embodiment, the cryptographic status can be either "encrypted" or "not-encrypted." In one embodiment, the cryptographic status is also stored in the tag associated with the object in the tag database. The tag field could be called "Encrypted" and the value could be either YES or NO. In other embodiments, the specific kind of encryption can also be indicated in this field. In one embodiment, the cryptographic status is assigned by performing a statistical encryption detection on the object as described above.

Once the object is classified as encrypted or not, in block 108, it is determined whether the transmission of the object as intercepted by the capture system 22 violates the cryptographic policy in effect over the network 10. In one embodiment, the cryptographic policy consists of a set of rules, also known as cryptographic rules. The cryptographic rules detail what transmissions must be encrypted, what transmissions may not be encrypted, and what transmissions allow but do not require encryption.

For example, one rule can forbid the encryption of objects between two departments. Another rule may require an encrypted channel between two other departments. The departments, and consequently the channels of transmission can be defined using lists or ranges of IP addresses. Specific IP addresses can be singled out as not being permitted to send encrypted data in any channel.

In one embodiment, the rules that make up the cryptographic policy are created by a user or group of users via the user interface 34. Referring again to FIG. 3, the rules of the cryptographic policy are maintained, in one embodiment, by the crypto analyser 35. The rules can be created or edited using the user interface 34.

In one embodiment, the user interface 34 includes a graphical cryptographic policy editor and rule author that simplifies the cryptographic rule writing. For example, the editor may allow the user to visually define an interdepartmental channel, and specify the policy (e.g., "must be encrypted channel") for the channel. The editor can have other features allowing a user to tailor the rules of the policy to the particular specifications of the policy.

In one embodiment, the crypto analyser 35 performs cryptographic status assignment and policy enforcement on objects being assembled in real time. In another embodiment, however, the crypto analyser 35 can also function in an "offline" mode, i.e., on objects already stored in the object store module 32. In yet another embodiment, part of the objects are analysed in real-time, and those that are not (e.g., because of speed constraints) are analysed later.

In one embodiment, the crypto analyzer 35 responds to detecting a policy violation (that is a violation of one of the rules) by generating an alert. The alert can be directed to a designated system administrator or group, or the user who authored the specific rule being violated by the captured object. The alert can be delivered via the user interface 34, and may include any information about the object contained in the tag associated with the object and the specific cryptographic rule violated by the object.

In one embodiment, the capture system 22 halts delivery of any objects violating the cryptographic policy. When this happens, the capture system 22 can alert the sender of the object (as defined by the source IP) that he or she is violating encryption policy, and that the captured transaction should be repeated in compliance with the policy.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
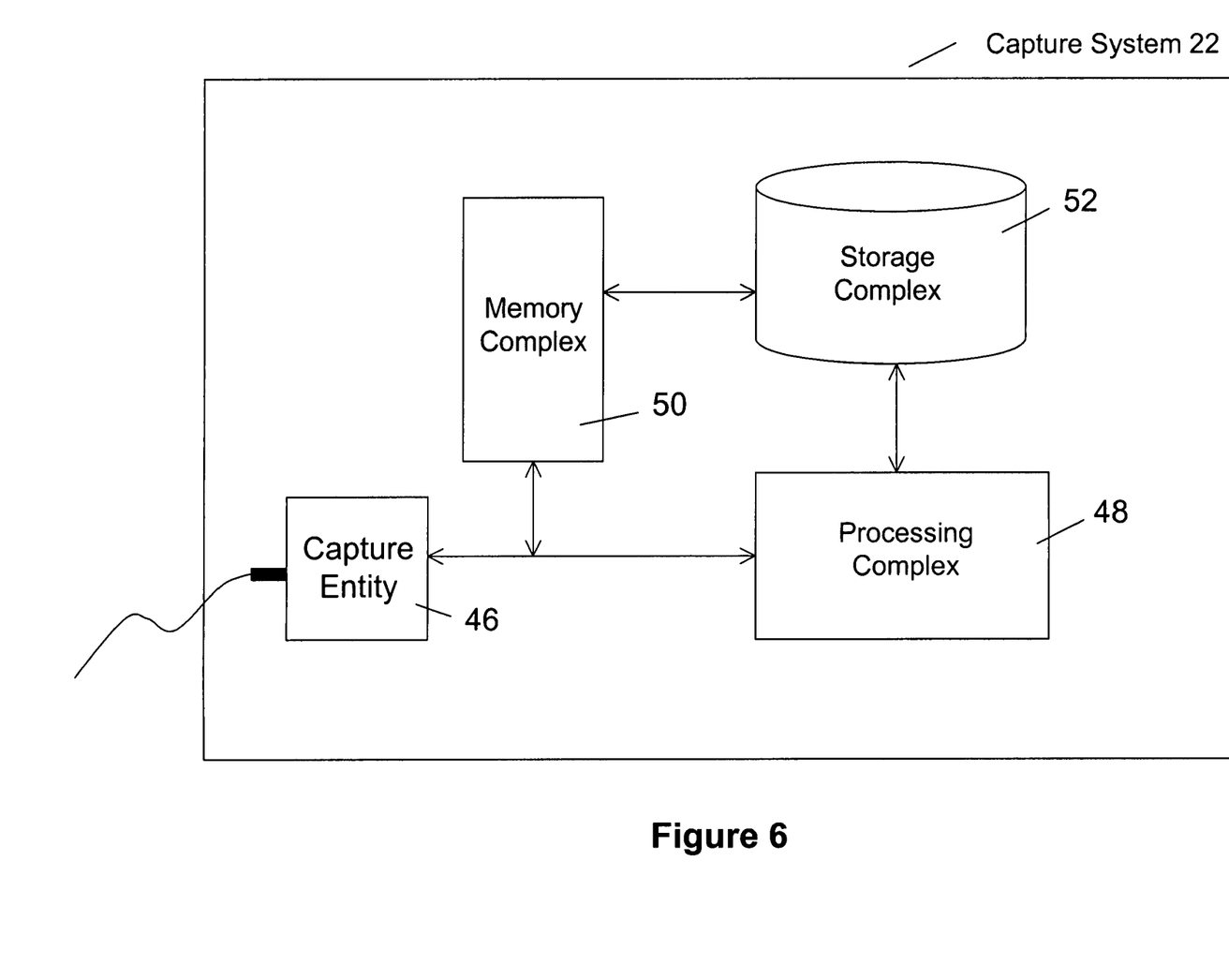
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and an object presentation procedure have been described. In the forgoing description, various specific values were given names, such as "objects" and "tags," and various specific modules, such as the "crypto analyzer" and "user interface" have been described. However, these names are merely to describe and illustrate various aspects of the present invention, and in no way limit the scope of the present invention. Furthermore, various modules, such as the crypto analyzer 35 in FIG. 3, can be implemented as software or hardware modules, or without dividing their functionalities into modules at all. The present invention is not limited to any modular architecture either in software or in hardware, whether described above or not.

What is claimed is:

1. A method comprising:
capturing packets being transmitted over a network;
assembling an object from the captured packets;
assigning a cryptographic status to the object by determining whether the captured object is encrypted; and
determining whether the object violated a cryptographic policy using the assigned cryptographic status of the object, wherein assigning a cryptographic status to the captured object comprises performing a statistical analysis on bytes in the captured object, and wherein the statistical analysis comprises calculating an index of coincidence for the bytes in the captured object.

2. The method of claim 1, wherein determining whether the object violated the cryptographic policy comprises determining that the object violated the cryptographic policy by being encrypted when the object was not expected to be encrypted.

3. The method of claim 1, wherein determining whether the object violated the cryptographic policy comprises determining that the object violated the cryptographic policy by being unencrypted when the object was required to be encrypted.

4. The method of claim 1, wherein determining whether the object violated the cryptographic policy comprises accessing at least one rule of the cryptographic policy related to a transmission channel in which the object was transmitted, and comparing the cryptographic status of the object to a status required by the rule.

5. The method of claim 4, wherein the transmission channel comprises a set of source Internet protocol (IP) addresses and a set of destination IP addresses.

6. The method of claim 1, further comprising allowing a user to edit the cryptographic policy.

7. The method of claim 1, further comprising generating an alert to a user if the cryptographic policy is determined to be violated.

8. The method of claim 1, further comprising blocking delivery of the object if the cryptographic policy is determined to be violated.

9. An apparatus that includes a processor and a non-transitory computer readable medium, comprising:
a packet capture module to capture packets being transmitted over a network;
an object assembly module to reconstruct an object from the captured packets; and
a cryptographic analyzer to determine whether the object violated a cryptographic policy in effect over the network, wherein a cryptographic status is assigned to the captured object and a statistical analysis is performed on bytes in the captured object, and wherein the statistical analysis comprises calculating an index of coincidence for the bytes in the captured object.

10. The apparatus of claim 9, wherein the cryptographic policy comprises a set of cryptographic rules.

11. The apparatus of claim 10, wherein at least one rule of the set of cryptographic rules defines a transmission channel and whether encrypted objects are allowed or not on the channel.

12. The apparatus of claim 10, wherein at least one rule of the set of cryptographic rules defines a transmission channel and whether encrypted objects are required or not on the channel.

13. The apparatus of claim 12, wherein the transmission channel comprises a set of source Internet protocol (IP) addresses and a set of destination IP addresses.

14. The apparatus of claim 10, further comprising a user interface configured to allow a user to edit the set of cryptographic rules.

15. The apparatus of claim 9, further comprising a user interface to transmit an alert to a user if the cryptographic policy is determined to be violated by the cryptographic analyzer.

16. The apparatus of claim 9, wherein the apparatus blocks delivery of the object if the cryptographic policy is determined to be violated by the cryptographic analyzer.

17. A method comprising:
capturing an object being transmitted over a network;
generating a tag associated with the captured object, the tag containing metadata related to the captured object;
assigning a cryptographic status to the captured object by determining whether the captured object was encrypted prior to being transmitted over the network; and
adding the cryptographic status of the captured object to the tag associated with the captured object, wherein assigning a cryptographic status to the captured object comprises performing a statistical analysis on bytes in the captured object, and wherein the statistical analysis comprises calculating an index of coincidence for the bytes in the captured object.

18. The method of claim 17, further comprising determining whether the captured object violates a cryptographic policy by checking the metadata contained in the tag against one or more cryptographic rules.

19. The method of claim 17, wherein one of the cryptographic rules prohibits transmission of encrypted objects from one or more source Internet protocol (IP) addresses.

20. The method of claim 17, wherein assigning a cryptographic status to the captured object does not rely on any known content in the captured object.

21. The method of claim 17, wherein the statistical analysis comprises preprocessing the bytes making up the captured object by calculating differences between adjacent bytes, and the index of coincidence is determined for the calculated differences.

22. A non-transitory machine-readable medium having stored thereon data representing instructions, that, when executed by a processor of a capture system, cause the processor to perform operations comprising:
capturing packets being transmitted over a network;
assembling an object from the captured packets;
assigning a cryptographic status to the object by determining whether the captured object is encrypted; and
determining whether the object violated a cryptographic policy using the assigned cryptographic status of the object, wherein assigning a cryptographic status to the captured object comprises performing a statistical analysis on bytes in the captured object, and wherein the statistical analysis comprises calculating an index of coincidence for the bytes in the captured object.

23. The machine-readable medium of claim 22, wherein determining whether the object violated the cryptographic policy comprises determining that the object violated the cryptographic policy by being encrypted when the object was not expected to be encrypted.

24. The machine-readable medium of claim 22, wherein determining whether the object violated the cryptographic policy comprises determining that the object violated the cryptographic policy by being unencrypted when the object was required to be encrypted.

25. The machine-readable medium of claim 22, wherein determining whether the object violated the cryptographic policy comprises accessing at least one rule of the cryptographic policy related to a transmission channel in which the object was transmitted, and comparing the cryptographic status of the object to a status required by the rule.

26. The machine-readable medium of claim 25, wherein the transmission channel comprises a set of source Internet protocol (IP) addresses and a set of destination IP addresses.

27. A non-transitory machine-readable medium having stored thereon data representing instructions, that, when executed by a processor of a capture system, cause the processor to perform operations comprising:
   capturing an object being transmitted over a network;
   generating a tag associated with the captured object, the tag containing metadata related to the captured object;
   assigning a cryptographic status to the captured object by determining whether the captured object was encrypted prior to being transmitted over the network; and
   adding the cryptographic status of the captured object to the tag associated with the captured object, wherein assigning a cryptographic status to the captured object comprises performing a statistical analysis on bytes in the captured object, and wherein the statistical analysis comprises calculating an index of coincidence for the bytes in the captured object.

28. The machine-readable medium of claim 27, wherein the instructions further cause the processor to determine whether the captured object violates a cryptographic policy by checking the metadata contained in the tag against one or more cryptographic rules.

29. The machine-readable medium of claim 27, wherein one of the cryptographic rules prohibits transmission of encrypted objects from one or more source Internet protocol (IP) addresses.

30. The machine-readable medium of claim 27, wherein assigning a cryptographic status to the captured object does not rely on any known content in the captured object.

* * * * *